United States Patent [19]

Inoue et al.

[11] Patent Number: 5,920,680
[45] Date of Patent: Jul. 6, 1999

[54] IMAGE READING AND REPRODUCING APPARATUS

[75] Inventors: Toshiyuki Inoue; Yoshinori Morimoto, both of Kanagawa, Japan

[73] Assignee: Fuji Photo Film Co., Ltd., Kanagawa, Japan

[21] Appl. No.: 08/925,711

[22] Filed: Sep. 9, 1997

[30] Foreign Application Priority Data

Sep. 9, 1996 [JP] Japan .................................. 8-237449

[51] Int. Cl.$^6$ ................................................... G06F 15/00

[52] U.S. Cl. ............................ 395/101; 395/105; 358/486

[58] Field of Search ................................. 395/101, 105, 395/111, 112, 114; 358/486

[56] References Cited

U.S. PATENT DOCUMENTS 5,184,227  2/1993  Foley ........................................ 358/302
5,541,637  7/1996  Ohashi et al. ............................ 347/248
5,731,888  3/1998  Arai .......................................... 359/204

Primary Examiner—Edward L. Coles
Assistant Examiner—Jimmy D. Nguyen
Attorney, Agent, or Firm—Birch, Stewart, Kolasch & Birch, LLP

[57] ABSTRACT

The improved image reading and reproducing apparatus comprising a scanner which reads an image on an original photoelectrically, an image processor which performs specified image processing on image data output from the scanner and a printer which writes the image data output from the image processor into a memory, reads the recording image data sequentially from the memory and records an image on an auxiliary scanned recording material in accordance with the recording image data, satisfies the following relation (1):

$$Tr \geq (82.5/Vp) + \alpha \tag{1}$$

where $Tr$ is the time of reading one frame of the original image from the start of image reading with the scanner to the storage of obtained recording image data in the memory in the printer; $Vp$ is the speed of auxiliary scanning of the recording material in the printer; and $\alpha$ is the overhead time which occurs unavoidably between the recordings of two successive frames of the image in the printer. This image reading and reproducing apparatus ensures that each of its functional parts such as the scanner, image processor and recorder suffers only limited time losses such as interruptions of the operation of that part due to other parts, thereby allowing for efficient and high-speed outputting of the finished prints.

4 Claims, 5 Drawing Sheets

IMAGE READING AND REPRODUCING APPARATUS

BACKGROUND OF THE INVENTION

This invention relates to the art of image reading and reproducing apparatus, in which an original image is read photoelectrically and subjected to image processing to produce image data, in accordance with which recording light is modulated and used to expose a recording material such as a light-sensitive material, thereby recording an image on it. The invention particularly relates to an image reading and reproducing apparatus which is suitable for use with digital photoprinters which read the image on a film photoelectrically and print it on a light-sensitive material (photographic paper) by exposure through scanning with optical beams modulated in accordance with the digital image data.

The original image is read photoelectrically with a scanner (image reading apparatus) using an image sensor such as a CCD (charge coupled device) sensor to obtain associated image data, which is subjected to image processing in an image processor (image processing apparatus) to produce image data for image recording, which is supplied to a printer (image recording apparatus) to give a reproduced image. This type of image reading and reproducing apparatus is used in various kinds of printers, photographic printing apparatus, printing platemaking apparatus, etc.

Conventionally, the image recorded on a photographic film such as a negative or a reversal film (these films are hereinafter referred to simply as "a film" or "films" depending on the case) is printed on a light-sensitive material such as a photographic paper mostly by a technique called "direct exposure", in which the light-sensitive material is subjected to areal exposure by means of projected light carrying the information of the image on the film.

In recent years, digital photoprinters, or printing apparatus which utilize a digital image recording system, have been commercialized. In digital photoprinters, the projected light from the original film is read with a scanner to provide digital data representing the image recorded on the film; the digital image data is then sent to the image processor, where it is subjected to various image processing steps such as color/density correction, edge enhancement and tone correction, thereby producing recording image data (exposure conditions), which are sent to a printing unit, where the light-sensitive material is exposed by scanning with optical beams modulated in accordance with the image so as to record an image (latent image) and the exposed light-sensitive material is developed to produce a finished print having a visual image.

In the digital photoprinters, the image recorded on the original film is successively read frame by frame with the scanner and sent sequentially to the image processor, where it is subjected to image processing, with the resulting image data being transferred sequentially to the printing unit.

The printer has a memory for storing several frames of the image and the image data sent from the image processor is stored in the memory before it is retrieved on a FIFO basis to perform the desired image recording.

Therefore, in apparatus such as digital photoprinters which perform continuous image reading and reproducing operations, it is preferred for the purpose of accomplishing efficient and high-speed image recording, namely, for outputting the finished prints efficiently, that the retrieved image data are successively subjected to image processing to perform successive recording. Referring to the scanner, it is preferred that as soon as the reading operation ends, it reads the next frame of an image.

In other words, it is preferred that there is no possibility for the continuous reading and image processing operations to be suspended on account of the image recording with the printer or that the printer will not be forced into a state where it waits for the next image data to be transferred from the image processor; alternatively, each part of the apparatus should be in operation at all times to enable the outputting of finished prints.

Speaking of the scanner, image processor and printer as individual functional parts, they are each preferred to be capable of high throughputs per unit time. On the other hand, the reading and recording times will vary with several factors such as the size of the original, the magnification of the output image and the size of the finished print.

Therefore, with an image reading and reproducing apparatus, particularly one of a type that performs continuous image reading and recording operations, it is required that the individual functional parts such as the scanner, image processor and printer exhibit their performance to the fullest extent thereby achieving high efficiency in image recording, or the outputting of finished prints.

SUMMARY OF THE INVENTION

An object of the present invention is to provide an image reading and reproducing apparatus which reads the original image photoelectrically, performs image processing on the thus read image and then performs image recording to output the finished prints. The apparatus is characterized in that each of its functional parts such as the scanner, image processor and printer suffers only limited time losses such as interruptions of the operation of that part due to other parts, thereby allowing the apparatus to output the finished prints efficiently at high speed.

In order to achieve the above object, the invention provides an image reading and reproducing apparatus comprising:

a scanner which reads an image on an original photoelectrically to output image data;

an image processor which performs specified image processing on the output image data from said scanner to produce recording image data; and a printer which writes the recording image data output from said image processor into a memory, reads said recording image data sequentially from the memory and records an image on an auxiliary scanned recording material in accordance with said read recording image data;

said apparatus satisfying the following relation (1):

$$Tr \geq (82.5[\text{mm}]/Vp) + \alpha \qquad (1)$$

where Tr is the time (in seconds) of reading one frame of the original image from the start of image reading with said scanner to the storage of obtained recording image data in the memory in said printer; Vp is the speed (in millimeters per second) of auxiliary scanning of the recording material in said printer; and α is the overhead time (in seconds) which occurs unavoidably between the recordings of two successive frames of the image in said printer.

It is preferred that the image reading and reproducing apparatus has a rewinding mechanism which, when the printer stops auxiliary scanning of the recording material, optionally transports the recording material in a reverse direction opposite to the auxiliary scanning direction.

It is also preferred that the image reading and reproducing apparatus further satisfies the following relation (2) in terms of Tr, Vp and α:

$$Tr \leq (305[mm]/Vp) + \alpha \qquad (2).$$

Tr is preferably no more than 5 seconds.

DETAILED DESCRIPTION OF THE INVENTION

The image reading and reproducing apparatus of the invention will now be described in detail with reference to the preferred embodiment shown in the accompanying drawings.

Figure 1:
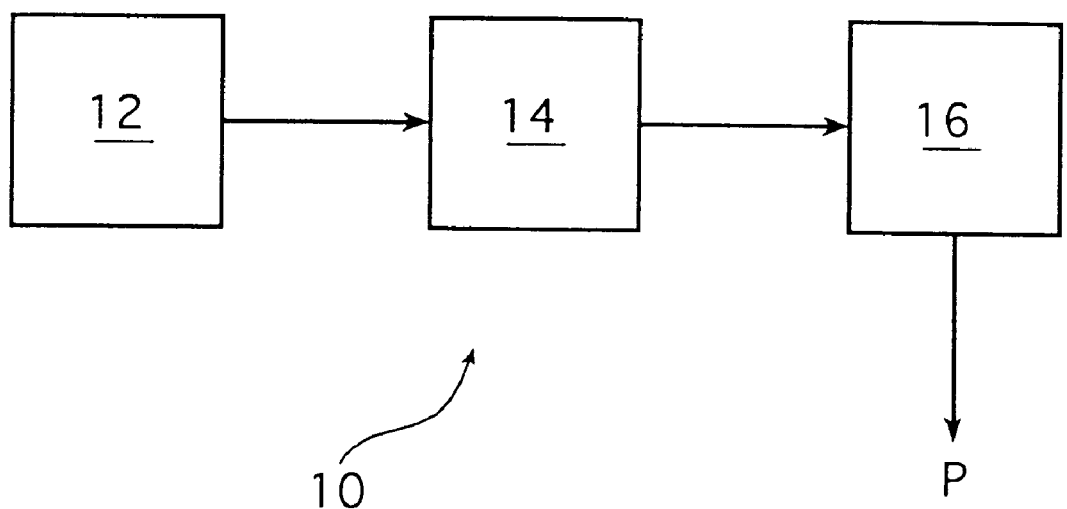
FIG. 1 is a block diagram of an embodiment of a digital photoprinter incorporating the image reading and reproducing apparatus of the invention.

FIG. 1 is a block diagram of one embodiment of a digital photoprinter utilizing the image reading and reproducing apparatus of the invention.

The digital photoprinter generally indicated by 10 in FIG. 1 comprises essentially a scanner 12, an image processor 14 and a printer 16. The scanner 12 reads photoelectrically the image recorded on a film (strip) F or a slide which has a reversal film retained on a frame; the image processor 14 performs specified image processing on the image data read from the film by means of the scanner 12; and the printer 16 is a recording unit that exposes the light-sensitive material A by scanning with light beams modulated in accordance with the recording image data processed with the image processor 14 and which then performs development and other processing to output a finished print P.

It should be noted that the applicability of the image reading and reproducing apparatus of the invention is not limited to the illustrated digital photoprinter; it is applicable to various known types of image reading and reproducing apparatus, in which the light bearing the image of a transmission original (transmitted light) or a reflection original (reflected light) is read photoelectrically with an image sensor to produce output signals (i.e., image data) which are given specified image processing to be converted to recording image data, which are used to record an image on a recording material being auxiliary scanned such as a light-sensitive material, an electrophotographic photoreceptor or a thermal recording material, thereby producing a finished print having the original image reproduced thereon.

Figure 2:
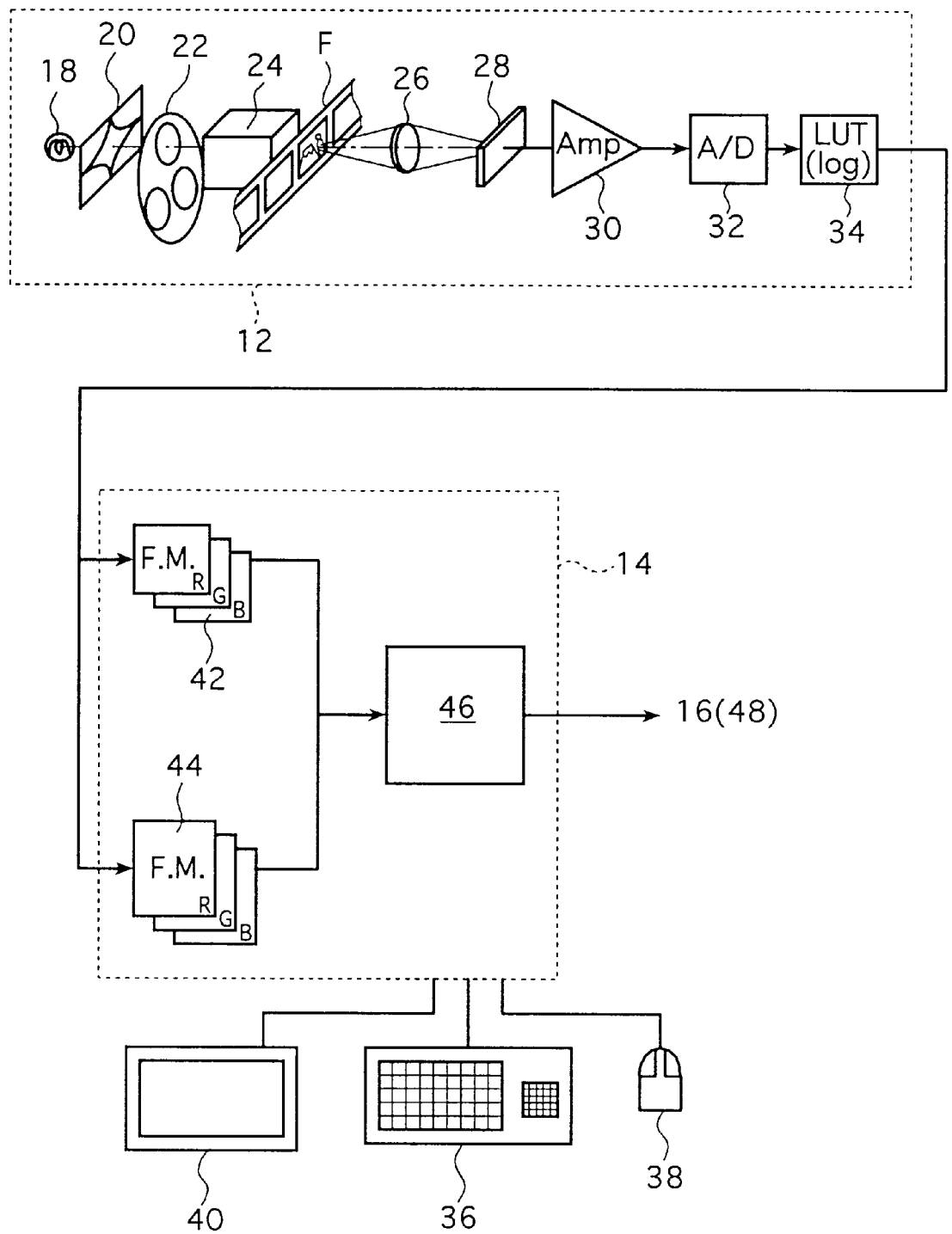
FIG. 2 shows the concept of an embodiment of the scanner and the image processor in the digital photoprinter shown in FIG. 1.

FIG. 2 shows schematically the scanner 12 and the image processor 14.

The scanner 12 reads photoelectrically the image recorded on the film F and comprises a light source 18, a variable diaphragm 20, a color filter assembly 22 having three color filters for separating the image on the film F into three primary colors R (red), G (green) and B (blue) and which is rotated to have a desired color filter inserted into the optical path, a diffusion box 24 by which the reading light incident on the film F is rendered uniform along the surface of the film F, an imaging lens 26, a CCD sensor 28 which is an area sensor to read one frame of the image on the film F, an amplifier 30, an A/D (analog/digital) converter 32 and a LUT (look-up table) 34 for performing logarithmic conversion on signals to produce density signals.

In the scanner 12, the reading light issued from the light source 18 is adjusted in quantity by means of the variable diaphragm 20, passed through the color filter assembly 22 to be adjusted in color and diffused by the diffusion box 24 before it is incident on the film F, through which it is transmitted to produce projected light bearing the image of the film F.

The projected light then passes through the imaging lens 26 to be imaged on the light-receiving surface of the CCD sensor 28, which reads the image photoelectrically. Output signals from the CCD sensor 28 are amplified by the amplifier 30, converted to digital signals by the A/D converter 32, further converted to density signals in the LUT 34 and sent to the image processor 14 as (digital) data for the image recorded on the film F.

The scanner 12 performs such image reading three times by sequentially inserting the R, G and B color filters of the color filter assembly 22 into the optical path such that the image on the film F is separated into the three primary colors R, G and B for subsequent reading.

The illustrated scanner 12 performs prescanning to read the image coarsely at low resolution before continuous image reading (fine scanning) is performed to provide image data to be finally outputted.

Thus, the scanner 12 reads one frame of image by performing six consecutive image reading operations with the CCD sensor 28.

The image processor 14 sets up various image processing conditions from the image data obtained by prescanning and, in accordance with the thus set conditions, performs image processing on the image data obtained by fine scanning so as to produce output image data for performing image recording with the printer 16.

In addition to controlling the overall operation of the digital photoprinter 10, the image processor 14 composes a system to operate it by interfacing with a keyboard 36, a mouse 38 and a display 40 which presents the prescanned image, operating instructions, etc.

The image processor 14 comprises a prescan memory 42, a fine scan memory 44 and an image processing unit 46. The prescan memory 42 and the fine scan memory 44 are each a frame memory for storing the image data. The image data obtained by prescanning are sequentially sent to the prescan memory 42 for storage whereas the image data obtained by fine scanning are sequentially sent to the fine scan memory 44 for storage.

The image processing unit 46 is composed of a CPU, memories and various image processing circuits in combination. When the prescanned R, G and B image data are stored in the prescan memory 42, the image processing unit 46 sets image processing conditions based on the stored prescanned image data; it then reads the fine scanned image data out of the fine scan memory 44 and, in accordance with the already set image processing conditions, performs various image processing operations such as adjustment of the color/density balance, tone adjustment, as well as the compression and expansion of the dynamic range, and supplies an image memory 48 in the printer 16 with recording image data for image recording with the printer 16.

The digital photoprinter 10 is basically adapted to be capable of automatic execution of all processes starting with the reading of the image recorded on the film F, going through the outputting of the image data into the image memory 48 in the printer 16 and ending with the production of a finished print P. Therefore, the digital photoprinter 10 does not require verification, adjustment or other manual operations to be done by the operator (this feature of the digital photoprinter 10 is hereinafter referred to as a "full auto mode").

However, if necessary (and by selecting a relevant mode), the image processor 14 may be operated such that the operator looks at the prescanned image presented on the display 40 and manipulates the mouse 38, keyboard 36, etc. to adjust the position of the film F from which the image is to be read, perform trimming (adjustment of the reading magnification) and any other adjustments; in addition, the operator may perform verification to make adjustment of color/density, tone, dynamic range and other parameters before image data are outputted from the image processor 14 into the image memory 48.

According to the invention, the digital photoprinter 10 is adapted to be such that when reading one frame of image in the full auto mode, the one frame reading time Tr (in seconds) from the start of reading to the storage of image data in the image memory 48 in the printer 16 and the auxiliary scan speed Vp (mm/sec) of the light-sensitive material A in the printer 16 to be described below satisfy the following relation (1):

$$Tr \geq (82.5[mm]/Vp) + \alpha \qquad (1)$$

By satisfying this requirement, the digital photoprinter 10 realizes efficient and high-speed outputting of finished prints P, as will be discussed below in detail.

The reading time Tr is not limited to any particular value and may be set or determined as appropriate for the storage time of the CCD sensor 28, the image processing speed, as well as the auxiliary scan speed Vp of the printer 16 to be described below, etc. Preferably, Tr is not more than 5 seconds. By setting Tr to be 5 seconds or shorter, finished prints P can be outputted rapidly enough to produce the preferred result.

Figure 3:
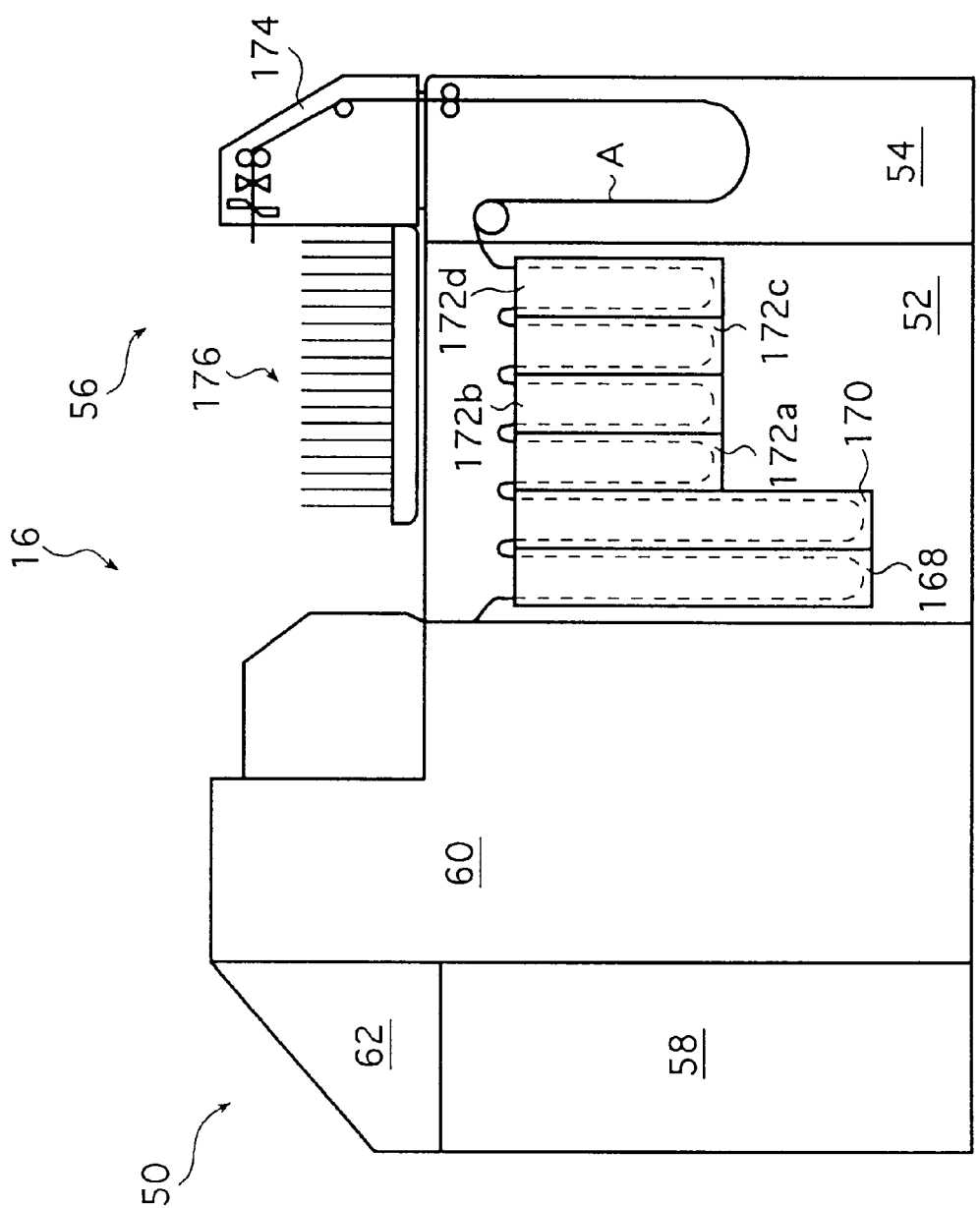
FIG. 3 shows the concept of an embodiment of the printing unit in the digital photoprinter shown in FIG. 1.

FIG. 3 is a schematic representation of the printer 16. In the printer 16, the light-sensitive material (photographic paper) A is exposed by scanning with light beams modulated in accordance with the image data (i.e., exposing conditions) delivered from the image processor 14 and stored in the image memory 48, and the light-sensitive material A carrying a latent image is developed, dried and cut to produce finished prints P having a visual image, and then the finished prints P are subsequently sorted.

The printer 16 having these capabilities comprises essentially an image recording section 50, a developing section 52, a drying section 54, an ejecting section 56 and an electrical section 58 accommodating a control board, a power supply and other necessary components.

The image recording section 50 comprises a print/transport device 60 and an optical beam scanning device 62.

Figure 4:
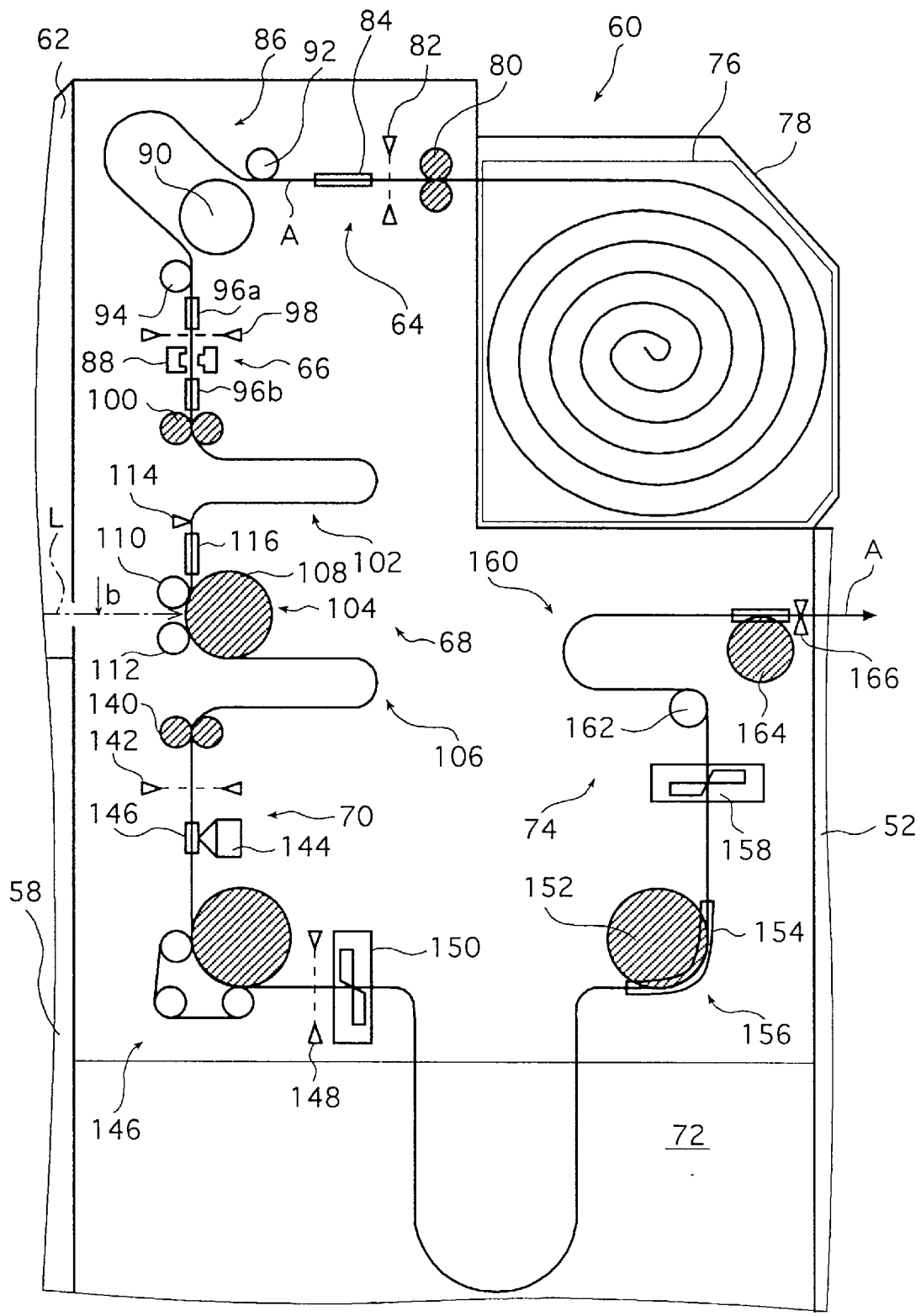
FIG. 4 shows the concept of an embodiment of the print transport system in the printing unit shown in FIG. 3.
Figure 5:
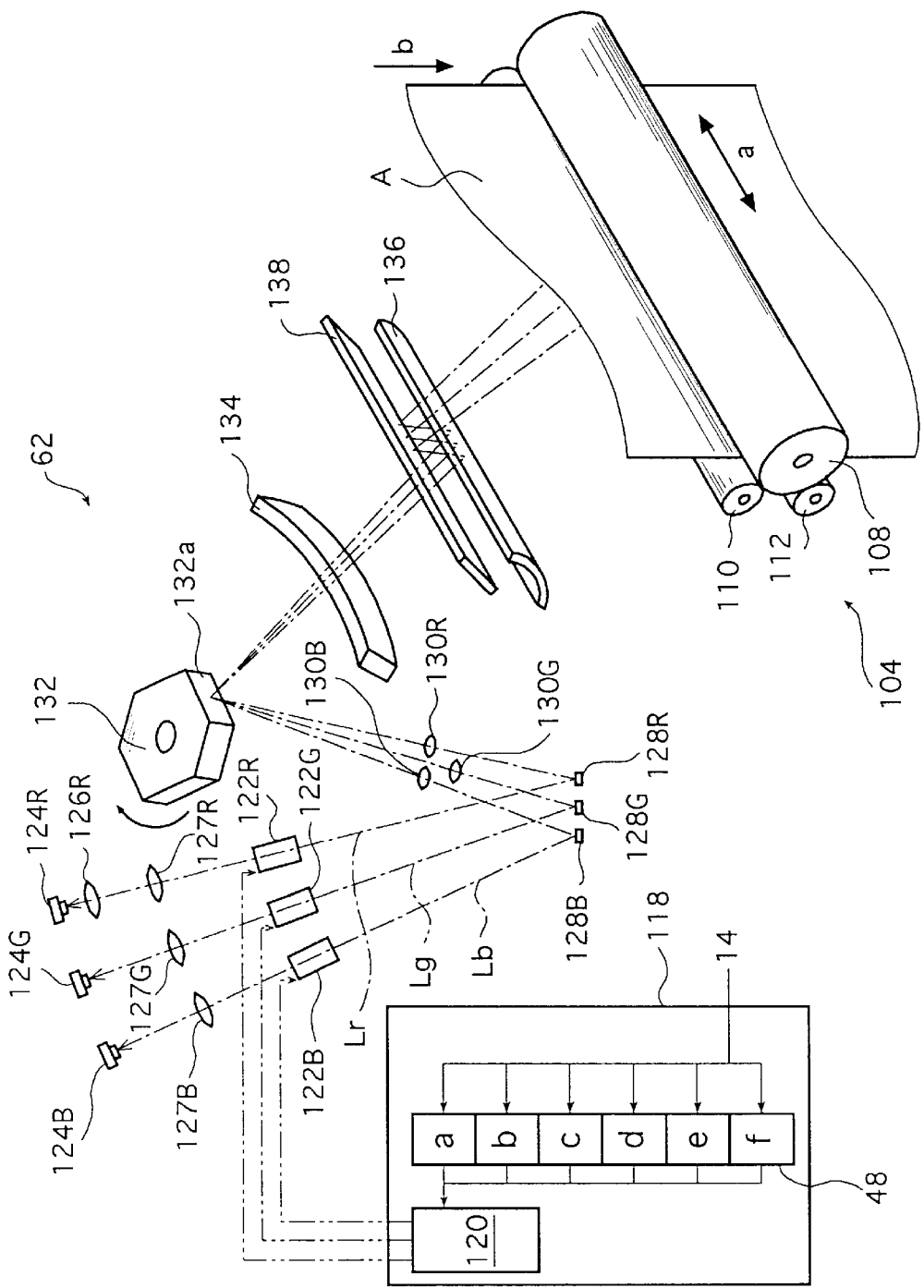
FIG. 5 is a perspective view showing schematically an embodiment of the optical beam scanning device in the printing unit shown in FIG. 3.

FIG. 4 shows schematically the print/transport device 60, and FIG. 5 shows schematically the optical beam scanning device 62 (as well as auxiliary scan transport system 104).

In the print/transport device 60, the light-sensitive material A is unwound from a roll and transported in a predetermined path as various processes are performed such as the recording of image position information, imagewise exposure (printing) and back printing. As shown, the print/transport device 60 has a light-sensitive material supply section 64, a frame information constructing section 66, an exposing section 68, a back printing section 70, a reservoir 72, a light-sensitive material ejecting section 74, and transport means for transporting the light-sensitive material A in a predetermined path that threads through these sections.

The light-sensitive material supply section 64 is an area that is loaded with a magazine 76 having a web of light-sensitive material A wound in a roll form that is contained in a light-shielding enclosure such that it can be drawn out of the magazine 76 to be supplied into the subsequent section. As shown, the light-sensitive material supply section 64 comprises an area 78 in which the magazine 76 is loaded, as well as a drawing roller pair 80, a sensor 82, a guide 84, etc. that are positioned downstream of the magazine loading area 78 in the direction of transport of the light-sensitive material (the term "downstream" as it appears hereinafter shall be construed to have the meaning just described above).

The light-sensitive material A is drawn out of the magazine 76 by means of the drawing roller pair 80 and transported to a first loop forming section 86 downstream of the light-sensitive material supply section 64.

The sensor 82 detects the leading edge of the light-sensitive material A or checks for its presence or absence when the light-sensitive material A is rewound or re-loaded (threaded initially) as in magazine replacement.

The first loop forming section 86 is positioned downstream of the light-sensitive material supply section 64. It forms a loop (a surplus or slack portion) of the light-sensitive material A to thereby ensure that it will stop smoothly when a punch 88 in the downstream frame information constructing section 66 is activated. As shown, the first loop forming section 86 comprises a drive roller 90, guide rollers 92 and 94, etc.

The drawing roller pair 80 draws the light-sensitive material A out of the magazine 76 in accordance with its amount present in the first loop forming section 86. The frame information constructing section 66 is provided downstream of the first loop forming section 86. In ordinary photographic printing and development processes including the one performed with the illustrated printer 16, the light-sensitive material A is not cut during the process but remains in a web form as it is subjected to continuous imagewise exposing and developing processes and the processed web is eventually cut into individual finished prints P in the ejecting section 56. Therefore, in order to determine or detect the image recording position on the light-sensitive material A, the position of its cutting, the back printing position and the like, "frame information" which is position information representing the boundary between adjacent prints (frames) has to be constructed. In addition, "sort information" which represents the position for a unit number of prints corresponding to one film has to be constructed for the purpose of sorting in the ejecting section 56. The frame information constructing section 66 is a site for constructing the above-defined frame information and/or sort information by making holes at the advancing end of the light-sensitive material A in a position that corresponds to a single frame or the unit number of prints to be sorted.

In the illustrated case, the frame information constructing section 66 comprises a punch 88 for perforating the light-sensitive material A to provide holes representing frame information and/or sort information, guides 96a and 96b provided upstream and downstream, respectively, of the punch 88, a sensor 98 for detecting the advancing end of the light-sensitive material A, and a transport roller pair 100. The transport roller pair 100 transports frame by frame the light-sensitive material A and repeats this process intermittently in accordance with its amount in a second loop forming section 102 to be described just below. When the necessary transport ends, the punch 88 is activated to construct frame information and/or sort information.

Provided downstream of the frame information constructing section 66 is the exposing section 68 having the second loop forming section 102, a auxiliary scan transport system 104 and a third loop forming section 106. In the illustrated apparatus, the exposing section 68 and the optical beam scanning device 62 positioned to its left as seen in FIG. 4 cooperate to expose the light-sensitive material A two-dimensionally by scanning with the light beams L modulated in accordance with the aforementioned recording image data so as to record a latent image.

FIG. 5 shows schematically the optical beam scanning device 62 and the auxiliary scan transport system 104. The optical beam scanning device 62 is of a well-known type which comprises essentially sources of light beams for effecting R, G and B exposure, modulating means such as AOMs (acoustic optical modulators), an optical deflector such as a polygonal mirror and an fθ lens.

The auxiliary scan transport system 104 in the exposing section 68 comprises the following components: an exposing drum 108 which transports the light-sensitive material A in an auxiliary scanning direction (indicated by arrow b in FIG. 5) which is generally perpendicular to a main scanning direction (indicated by arrow a) as it is held in a specified exposing position; two nip rollers 110 and 112 that are spaced apart in the auxiliary scanning direction, with the exposing position (scanning line) lying in between, and which are urged against the exposing drum 108 with the light-sensitive material A being interposed; a sensor 114 for sensing the frame information to thereby detect the image recording position; and a guide 116 (see FIG. 4). The light-sensitive material A is transported in the auxiliary scanning direction by means of the exposing drum 108 in combination with the nip rollers 110 and 112.

The optical beam scanning device 62 is basically controlled by the recording controller 118. The recording controller 118 has the aforementioned image memory 48 for storing the data for the image to be recorded as it is supplied from the image processor 14, as well as an image data processing section 120.

The image memory 48 is a frame memory capable of storing six frames of data for a standard size image on the printer 16 and it consists basically of six divided regions a–f. As already mentioned, the recording image data supplied from the image processor 14 is transferred into the image memory 48, where it is stored sequentially in regions a–f and, as the image recording proceeds, the image data is read out of the image memory 48 (in the order it was supplied from the image processor 14), and the thus read image data is subjected to successive image recording.

In the ordinary image recording mode, the image data processing section 120 operates in such a way that the image data supplied from the image processor 14 and stored in regions a–f of the image memory 48 is read out in the order it was supplied, followed by specified processing such as calibration with correction tables, and in accordance with the obtained image data (i.e., the image to be recorded), AOMs 122 to be described below are driven to modulate light beams L to which the light-sensitive material A is to be exposed.

The optical beam scanning device 62 which is to be controlled by the recording controller 118 composes tri-beam non-combining optics in which laser beams of three primary colors are incident at slightly different angles to scan and expose the light-sensitive material A; specifically, the scanner 62 comprises laser light sources 124 (124R, 124G and 124B) and the following components which are arranged along the travel of light beams L issued from the respective laser light sources 124 (124R, 124G, 124B): a collimator lens 126R, condenser lenses 127 (127R, 127G and 127B); acoustic optical modulators (AOMS) 122 (122R, 122G and 122B); reflector mirrors 128 (128R, 128G and 128B); cylindrical lenses 130 (130R, 130G and 130B); a polygonal mirror 132; an fθ lens 134; a cylindrical mirror 136; and a reflector mirror 138.

The illustrated tri-beam non-combining optics employs three laser light sources that issue light beams of specified wavelengths in association with the exposure of the light-sensitive material A to red (R) light, green (G) light and blue (B) light, respectively, such that the light beams L issued from the respective laser light sources are incident at a single point on a reflecting face 132a of the polygonal mirror 132 at slightly varying angles (say, about 4 degrees) and then deflected in the main scanning direction to form images at different angles in the same main scanning line on the light-sensitive material A to thereby scan over the same main scanning line at timed intervals.

Referring to the laser light source 124R, it may be a semiconductor laser diode (LD) issuing a light beam Lr for R exposure at a wavelength of 680 nm; the laser light source 124G may be a wavelength transforming laser which employs a SHG (second harmonic generation) device issuing a light beam Lg for G exposure at a wavelength of 532 nm; and the laser light source 124B may be a wavelength transforming laser which employs a SHG device issuing a light beam Lb for B exposure at a wavelength of 473 nm.

The collimator lens 126R shapes the light beam Lr from the laser light source 124R such that it is rendered parallel beams. The condenser lenses 127 condense the respective light beams L (Lr, Lg, Lh) to be launched into the associated AOMs 122. As already mentioned, the AOMs 122 are driven by the image data processing section 120 of the recording controller 118 to modulate the respective light beams L in accordance with the image data.

The reflector mirrors 128 will fold back the optical paths of the respective light beams L such that they are incident on the reflecting face 132a of the polygonal mirror 132 either at the same point or in proximate position on the same line.

Each of the cylindrical lenses 130 combines with the fθ lens 134 and the cylindrical mirror 136 to make up optics for correcting the tilting of the polygonal mirror 132. The fθ lens 134 ensures that each of the light beams L will be correctly focused in any of the positions on the main scanning line.

In addition to making up the tilt correcting optics, the cylindrical mirror 136 bends the respective light beams L to be incident on the reflector mirror 138 which rebends the respective light beams L to be directed toward the main scanning line which is on the light-sensitive material A being transported by the auxiliary scan transport system 104 and which is generally perpendicular to the auxiliary scanning direction.

If more than a specified amount of the light-sensitive material A is present in the second loop forming section 102 and when one or more frames of the image data have been stored in the image memory 48 in the recording controller 118, the auxiliary scan transport system 104 transports the light-sensitive material A at a specified auxiliary scan (transport) speed Vp (in millimeters per second).

When the light-sensitive material A is transported by the auxiliary scan transport system 104 until the frame information is detected with the sensor 114, the optical beam scanning device 62 starts to operate. When the light-sensitive material A has been transported until the RECORD START position coincides with the exposing position, it starts to be exposed by scanning with the respective light beams L modulated with the associated AOMs 122 in accordance with the image data.

As already mentioned, the light beams L are deflected in the main scanning direction (indicated by arrow a) whereas the light-sensitive material A is transported in the auxiliary scanning direction (indicated by arrow b) which is perpendicular to the main scanning direction; as a result, the light-sensitive material A is subjected to full-frame exposure by two-dimensional scanning with the light beams L.

In a full auto mode which requires neither verification nor adjustments by the operator, the digital photoprinter 10 incorporating the image reading and reproducing apparatus of the invention satisfies the following relation:

$$Tr \geq (82.5[mm]/Vp) + \alpha \qquad (1)$$

where Tr is the one-frame reading time (in seconds) from the start of reading with the scanner 12 to the storage of image data in the image memory 48 in the printer 16; Vp is the speed (in millimeters per second) of auxiliary scanning with the auxiliary scan transport system 104; and α is the overhead time (in seconds) which occurs unavoidably between the recordings of two successive frames of image.

As already mentioned in connection with the prior art, efficient and high-speed outputting of finished prints P requires that the image data that have been read should be successively subjected to image processing for successive recording and that the scanner should be capable of reading the next frame of image as soon as the reading of the preceding frame has ended. In a specific situation, the recording with the printer 16 should be fast enough and the storage capacity of the image memory 48 should not be exhausted to necessitate the interruption of the reading operation with the scanner 12; in addition, the reading with the scanner 12 should be fast enough to ensure that the printer 16 will not be forced into a state where it waits for the transfer of image data. In other words, every functional part of the digital photoprinter 10 should preferably operate in an efficient way to enable the outputting of finished prints P.

By satisfying the relation (1) in terms of the reading time Tr, auxiliary scan speed Vp and overhead time α, the present invention enables efficient outputting of finished prints P.

In the relation (1), 82.5 mm represents the length of the shorter side of a finished print of "E" size and this is the shortest length in the auxiliary scanning direction that provides for continuous recording with the digital photoprinter. Stated specifically, in the present invention, the shortest recording time per frame including the overhead time α is set to be shorter than the time of reading one frame, whereby the possibility of the exhaustion of the storage region of the image memory 48 is minimized to enable continuous reading and, hence, efficient outputting of finished prints P.

The overhead time α is the time which unavoidably occurs during the non-recording period between the recordings of two successive frames of image due to various factors such as the interval between frames for which frame information and the like are constructed, as well as the time required for the light-sensitive material A to be rewound and the rise time of the auxiliary scan transport system 104 which are to be described below. The value of α is determined as appropriate for the above-mentioned factors including the interval between successive frames on the light-sensitive material A and the rise time of the auxiliary scan transport system 104; typically, α is in the range of 0.2–0.5 seconds, preferably no more than 0.3 seconds.

The reading time Tr and the auxiliary scan speed Vp may be set appropriately to satisfy the relation (1) depending on various factors including, for example, the overhead time α, the size of the finished print to be outputted most frequently, the storage time of the CCD sensor and the processing speed of the image processing unit.

It should, however, be noted that generally in scanned exposure such as exposure by scanning with light beams, the auxiliary scanning speed is inherently limited by the performance of the scanner in order to ensure the desired image quality and it cannot be made faster than the upper limit dictated by the scanner. On the other hand, the reading time can be adjusted fairly easily by such methods as adjusting the quantity of the reading light and improving the performance of the image processor 14. Therefore, in order to realize the digital photoprinter 10 (and, hence, the image reading and reproducing apparatus in it) which is capable of high-speed outputting of finished prints P having high image quality, the reading time Tr is preferably set in accordance with the auxiliary scanning speed Vp.

In order to ensure more efficient operations, the reading time Tr is preferably set to be slightly longer than the usual recording time per frame of the size of the finished print to be outputted most frequently (which is usually of an "L" size).

In addition to the relation (1), the present invention preferably satisfies the following relation (2) in terms of the reading time Tr, the auxiliary scanning speed Vp and the overhead time α:

$$Tr \leq (305[mm]/Vp) + \alpha \qquad (2)$$

In the relation (2), 305 mm represents the length of the longer side of a photographic paper of 254 mm×305 mm in size and this is the maximum length in the auxiliary scanning direction that provides for continuous recording with the digital photoprinter 10 applying the invention, shown in FIGS. 1–5. By setting the reading time Tr to be shorter than the maximum recording time per frame, efficient outputting of finished prints P can be realized.

In a preferred embodiment, the illustrated digital photoprinter 10 has a rewinding mechanism which, when the auxiliary scan transport system 104 stops transporting the light-sensitive material A, is activated to transport it in a reverse direction (opposite to the auxiliary scanning direction).

The illustrated digital photoprinter 10 is adapted to be such that if the recording conditions are satisfied, the auxiliary scan transport system 104 does not stop transporting the light-sensitive material A but transports it continuously and performs continuous image recording in response to the detection of frame information by the sensor 114.

However, if the recording conditions are no longer satisfied, namely, if less than a specified amount of the light-sensitive material A is present in the second loop forming section 102 or if less than one frame of image data is stored in the image memory 48, the auxiliary scan transport system 104 stops transporting the light-sensitive material A at the point of time when the recording of the present frame ends and the digital photoprinter 10 waits for the recording conditions to be satisfied again.

The illustrated digital photoprinter 10 is adapted to minimize the interval between adjacent frames in order to eliminate the waste of the light-sensitive material A. Therefore, if, the transport of the light-sensitive material A in the auxiliary scanning direction is stopped at the point of time when the recording of one frame ends, and if the recording (auxiliary scan transport) is resumed after the recording conditions are satisfied again, the speed of auxiliary scan transport has not yet reached a specified value when the recording of the next frame is started; in other words, the auxiliary scan transport system 104 is not fully activated and recording is started at such a slow auxiliary scanning speed that only non-compliant finished prints P will be produced.

To avoid this problem, the illustrated digital photoprinter 10 is adapted to be such that when the auxiliary scan transport stops, the light-sensitive material A is rewound by the specified amount necessary to fully activate (start up) the auxiliary scan transport system 104, thereby ensuring that the speed of auxiliary scan transport will reach the specified value when the recording operation is started after the transport of the light-sensitive material A was resumed. Thus, the rewinding mechanism described above enables the distance between frames to be minimized to thereby eliminate the waste of the light-sensitive material A.

An error that occurs to the auxiliary scan transport during exposure is a direct cause of deterioration in image quality as exemplified by streaks in the image. Therefore, in order to obtain prints having high-quality images recorded thereon, the light-sensitive material A has to be transported very precisely by means of the auxiliary scan transport system 104. In addition, the construction of frame information, the recording of an image with the optical beam scanning device 62 and the back printing to be described below differ from each other in terms of both timing and the transport speed of the light-sensitive material and, what is more, the transport of the light-sensitive material A has to be stopped when the frame information is constructed by making holes with the punch 88.

Under these circumstances, the illustrated digital photoprinter 10 has the second loop forming section 102 provided upstream of the auxiliary scan transport system 104, and a third loop forming section 106 downstream of the same auxiliary scan transport system 104, such that a loop of the light-sensitive material A is formed between the auxiliary scan transport system 104 and each of the upstream transport means (transport roller pair 100) and the downstream transport means (transport roller pair 140). The second and third loop forming sections will eliminate the adverse effects (e.g. back tension and stretching) which may be caused by the upstream and downstream transport means on the auxiliary scan transport by means of the auxiliary scan transport system 104, thus providing for highly precise auxiliary scan transport of the light-sensitive material A. Another function of the second loop forming section 102 is to ensure smooth stop of the light-sensitive material A when holes are made in the frame information constructing section 66.

The back printing section 70 is provided downstream of the exposing section 68. The back printing section 70 comprises a sensor 142, a printing device 144 for performing thermal transfer recording using an ink ribbon cassette, and a guide 146. The sensor 142 detects the already constructed frame information and, in accordance with the result of the detection of the frame information, the printing device 144 performs "back printing" by recording various print data on the back side (non-exposed surface) of the light-sensitive material A, as exemplified by the date of taking the pictures on the original film and the date of recording (printing) on the light-sensitive material A. The guide 146 serves not only to guide the light-sensitive material A but also as a platen (support) for the back printing operation.

A bending transport section 146 is provided downstream of the back printing section 70, and a sensor 148 and a first cutter 150 are provided downstream of the bending transport section 146. The first cutter 150 is not used in the ordinary operational state of the digital photoprinter 10 but typically used for ejecting all of the exposed light-sensitive material A which has been accommodated in the reservoir (to be described just below) after the end of the exposing procedure.

The reservoir 72 is provided downstream of the first cutter 150. The exposed light-sensitive material A is placed in the reservoir 72 temporarily and as the development process proceeds or with the lapse of time after exposure, the light-sensitive material A is ejected from the reservoir 72 to be transported to the subsequent step.

The reservoir 72 absorbs the time difference between the development process and the exposure (usually, the development process takes more time than the exposure) to thereby enable efficient operation of the digital photoprinter. In addition, the reservoir 72 is capable of preventing the fading of latent images which would otherwise occur if the exposure were immediately followed by the development process.

Provided downstream of the reservoir 72 is transport means 156 comprising a roller 152 and a guide 154, and the light-sensitive material A is transported from the reservoir 72 into the ejecting section 74 by this transport means 156.

The ejecting section 74 comprises a second cutter 158 and a fourth loop forming section 160 positioned downstream of the second cutter 158. The second cutter 158 is for cutting the light-sensitive material A in an emergency such as when a trouble has occurred. If a certain trouble occurs in the processor (developing section 52) or the like, the second cutter 158 will cut the light-sensitive material A so that no adverse effects will be transmitted to the exposed light-sensitive material A already accommodated in the reservoir 72.

The fourth loop forming section 160 forms a loop in order to ensure that the light-sensitive material A will not be damaged even if it is pulled inadvertently in the developing section 52; it comprises, in the direction of transport of the light-sensitive material A, a guide roll 162, transport means 164 and a sensor 166, and a loop is formed in accordance with both the speed of transport by the transport means 164, namely, the speed of processing in the developing section 52, and the transport by the transport means 156.

In the illustrated printer 16, the light-sensitive material A leaving the ejecting section 74 is transported into the developing section 52 which is a wet processor that performs developing and subsequent treatments in accordance with the type of the light-sensitive material A used. If the light-sensitive material A is a silver halide photographic material, the developing section 52 typically comprises a color developing tank 168, a bleach-fixing tank 170, rinsing tanks 172$a$, 172$b$, 172$c$ and 172$d$, as shown in FIG. 3. The exposed light-sensitive material A is sequentially submerged in the respective treating tanks so that it is subjected to specified treatments for development, whereby the latent image is rendered visible.

After the development, the light-sensitive material A is sent to the drying section 54, where it is dried by any known method and thence transported to the ejecting section 56.

The ejecting section 56 comprises a cutting section 174 and a sorter 176. The cutting section 174 detects the frame information and accordingly cuts the light-sensitive material A to produce single finished prints. The sorter 176 is of the usual type having a plurality of racks which, in accordance with the result of detection of the sort information by the cutting section 174, rotates or slides to change racks for accommodating a specified number of finished prints as sorted in accordance with the sort information.

While the image reading and reproducing apparatus of the invention has been described above in detail, it should of course be understood that the invention is by no means limited to the embodiment described above and that various improvements and modifications may be made without departing from the scope and spirit of the invention.

As described above in detail, the image reading and reproducing apparatus of the invention ensures that each of its functional parts such as the scanner, image processor and recorder suffers only limited time losses such as interruptions of the operation of that part due to other parts, thereby allowing for efficient and high-speed outputting of the finished prints.

What is claimed is:

1. An image reading and reproducing apparatus comprising:
   a scanner which reads an image on an original photoelectrically to output image data;
   an image processor which performs specified image processing on the output image data from said scanner to produce recording image data; and
   a printer which writes the recording image data output from said image processor into a memory, reads said recording image data sequentially from the memory and records an image on an auxiliary scanned recording material in accordance with said read recording image data;
   said apparatus satisfying the following relation (1):

$$Tr \geq (82.5[mm]/Vp) + \alpha \qquad (1)$$

where Tr is the time (in seconds) of reading one frame of the original image from the start of image reading with said scanner to the storage of obtained recording image data in the memory in said printer; Vp is the speed (in millimeters per second) of auxiliary scanning of the recording material in said printer; and a is the overhead time (in seconds) which occurs unavoidably between the recordings of two successive frames of the image in said printer.

2. An image reading and reproducing apparatus according to claim 1, which has a rewinding mechanism which, when said printer stops auxiliary scanning of the recording material, optionally transports said recording material in a reverse direction opposite to the auxiliary scanning direction.

3. An image reading and reproducing apparatus according to claim 1, which further satisfies the following relation (2) in terms of Tr, Vp and α:

$$Tr \leq (305[mm]/Vp) + \alpha \qquad (2).$$

4. An image reading and reproducing apparatus according to claim 1, wherein Tr is no more than 5 seconds.

* * * * *